(12) United States Patent
Kubicek et al.

(10) Patent No.: US 12,358,066 B2
(45) Date of Patent: Jul. 15, 2025

(54) DUAL TWIN-SAW WIRE CLADDING

(71) Applicant: ESAB AB, Gothenburg (SE)

(72) Inventors: Rastislav Kubicek, Gothenburg (SE); Zeljko Ackar, Partille (SE)

(73) Assignee: ESAB AB, Gothenburg (SE)

( * ) Notice: Subject to any disclaimer, the term of this patent is extended or adjusted under 35 U.S.C. 154(b) by 741 days.

(21) Appl. No.: 17/549,149

(22) Filed: Dec. 13, 2021

(65) Prior Publication Data
US 2023/0182226 A1    Jun. 15, 2023

(51) Int. Cl.
B23K 9/18 (2006.01)
B23K 9/04 (2006.01)
B23K 25/00 (2006.01)

(52) U.S. Cl.
CPC .............. B23K 9/188 (2013.01); B23K 9/04 (2013.01); B23K 25/005 (2013.01)

(58) Field of Classification Search
CPC ........ B23K 9/188; B23K 9/04; B23K 25/005; B23K 9/042; B23K 9/044
See application file for complete search history.

(56) References Cited

U.S. PATENT DOCUMENTS

| | | |
|---|---|---|
| 3,624,345 A | 11/1971 | Armstrong |
| 3,751,628 A | 8/1973 | Scherl |
| 4,442,340 A | 4/1984 | Kawabata et al. |
| 5,214,265 A | 5/1993 | Pollack |
| 8,785,806 B2 | 7/2014 | Ishigami et al. |
| 9,266,181 B2 | 2/2016 | Flagg et al. |
| 9,289,843 B2 | 3/2016 | Golding |
| 9,321,119 B2 | 4/2016 | Hayakawa et al. |

(Continued)

FOREIGN PATENT DOCUMENTS

| | | |
|---|---|---|
| EP | 2078582 A1 | 7/2009 |
| JP | S50149554 A | 11/1975 |

(Continued)

OTHER PUBLICATIONS

Notification of Transmittal of International Search Report and Written Opinion, including International Search Report and Written Opinion for International Application No. PCT/IB2022/061100 mailed Feb. 1, 2023, 17 pages.

(Continued)

*Primary Examiner* — Robert G Bachner
(74) *Attorney, Agent, or Firm* — Edell, Shapiro & Finnan, LLC (57) ABSTRACT

A system and method for dual-twin SAW cladding is disclosed. The method includes arranging a first twin SAW head in close proximity to a second twin SAW head, delivering electroslag flux to a surface of a workpiece to create a layer of electroslag flux atop the workpiece, directing two first consumable wires through the first twin SAW head towards the surface of the workpiece, directing two second consumable wires through the second twin SAW head towards the surface of the workpiece, introducing the two first consumable wires and the two second consumable wires into a molten slag pool formed on the surface of the workpiece to melt the two first consumable wires and the two second consumable wires via resistive heating, and translating the first twin SAW head and the second twin SAW head together to form a cladded deposit on the workpiece.

12 Claims, 4 Drawing Sheets

(56) References Cited

U.S. PATENT DOCUMENTS

| | | | |
|---|---|---|---|
| 9,764,410 B2 | 9/2017 | Ishigami et al. | |
| 10,766,100 B2 | 9/2020 | Nateghi et al. | |
| 2009/0261073 A1* | 10/2009 | Mui | B23K 9/042 |
| | | | 219/76.14 |
| 2014/0339203 A1 | 11/2014 | Peters et al. | |
| 2017/0312844 A1* | 11/2017 | Brambilla | B23K 9/0026 |

FOREIGN PATENT DOCUMENTS

| | | |
|---|---|---|
| JP | S62009777 A | 1/1987 |
| JP | H02200381 A | 8/1990 |
| JP | 2020075263 A | 5/2020 |

OTHER PUBLICATIONS

Improving productivity with submerged arc welding, https://www.thefabricator.com/thewelder/article/arcwelding/improving-productivity-with-submerged-arc-welding, May 25, 2010.

* cited by examiner

DUAL TWIN-SAW WIRE CLADDING

FIELD OF INVENTION

The present invention relates to the field of wire cladding and, in particular, dual twin-SAW wire cladding.

BACKGROUND

Cladding processes deposit a layer of material atop a base material (i.e., metallurgical deposition of a material on a workpiece). For example, the workpiece may be an iron alloy such as carbon steel, stainless steel, etc. In submerged arc welding ("SAW") cladding, one or more wires are melted with heat energy from an electric arc to produce the metallurgical deposition. By comparison, electroslag cladding (abbreviated as "ESC"), produces a metallurgical deposition by moving an electrode (typically a strip) into a pool of molten slag to melt the electrode with contact resistance heating (e.g., without an arc). In either case, the metallurgical deposition is covered by a layer of flux that prevents atmosphere from contacting the metallurgical deposition. However, the different processes use different fluxes specifically formulated for that process (e.g., ESC flux helps form a slag pool for resistive heating while SAW flux facilitates formation of an arc between the consumable and the workpiece).

Currently, no wire cladding processes produce a cladding deposit with a single deposition layer and simultaneously limit the iron content of the chemical composition of the cladded deposit to 5% or less. For example, SAW wire cladding processes, whether with one wire (called single-wire) or two wires (called twin-wire), typically apply a minimum of two layers of cladding deposit to complete a cladding operation. This is because SAW cladding processes cannot keep the iron content of the cladding deposit below 5% while depositing a necessary amount of cladding deposit in a single pass. At least because of SAW cladding processes require multiple passes (i.e., multiple layers), SAW cladding process are often limited to deposition rates of about 18 kg/hour.

A cladding apparatus and process that can clad a workpiece with a single layer of cladding while minimizing dilution levels and limiting the chemical composition of cladding deposit to have less than 5% iron content, is desirable.

SUMMARY

The present invention relates to a dual-twin SAW system for cladding. In accordance with at least one embodiment of the present invention, the dual-twin SAW system includes.

In some aspects, the techniques described herein relate to a method including: arranging a first twin submerged arc welding ("SAW") head in close proximity to a second twin SAW head; delivering electroslag flux to a surface of a workpiece to create a layer of the electroslag flux atop the workpiece; directing at least two first consumable wires through the first twin SAW head towards the surface of the workpiece; directing at least two second consumable wires through the second twin SAW head towards the surface of the workpiece; introducing the at least two first consumable wires and the at least two second consumable wires into a molten slag pool formed on the surface of the workpiece to melt the at least two first consumable wires and the at least two second consumable wires via resistive heating; and translating the first twin SAW head and the second twin SAW head together to form a cladded deposit on the workpiece.

In some aspects, the techniques described herein relate to a method, wherein the electroslag flux facilitates electrical couplings between at least the at least two first consumable wires and the workpiece to form the molten slag pool.

In some aspects, the techniques described herein relate to a method, wherein the electroslag flux is a conductive flux.

In some aspects, the techniques described herein relate to a method, wherein melting the at least two first consumable wires via resistive heating includes conducting a first current to the at least two first consumable wires.

In some aspects, the techniques described herein relate to a method, wherein melting the at least two second consumable wires via resistive heating further includes conducting a second current to the at least two second consumable wires.

In some aspects, the techniques described herein relate to a method, wherein the first current is a direct current and the second current is an alternating current.

In some aspects, the techniques described herein relate to a method, wherein the cladded deposit includes a single layer of NiCrMo3 with less than 5% iron content.

In some aspects, the techniques described herein relate to a method, wherein the cladded deposit is deposited at a rate of about 25 to 36 kg/hour.

In some aspects, the techniques described herein relate to a system for cladding a workpiece including: a first twin submerged arc welding ("SAW") head configured to receive a first leading wire and a first trailing wire along a first cladding line; and a second twin SAW head configured to receive a second leading wire and a second trailing wire along a second cladding line, the second twin SAW head arranged behind the first twin SAW head along a welding direction; wherein the second cladding line is offset from the first cladding line in a direction perpendicular to the first cladding line.

In some aspects, the techniques described herein relate to a system, wherein a separation distance between the first trailing wire and the second leading wire is set to deposit a single layer of NiCrMo3 with less than 5% iron content, wherein a thickness of the single layer meets a desired cladding thickness.

In some aspects, the techniques described herein relate to a system, wherein the separation distance is less than 10 mm.

In some aspects, the techniques described herein relate to a system, further including a flux hopper configured to apply an electroslag flux to the workpiece.

In some aspects, the techniques described herein relate to a system, wherein the electroslag flux facilitates resistive heating of the first leading wire, the first trailing wire, the second leading wire, and the second trailing wire.

In some aspects, the techniques described herein relate to a system for cladding a workpiece including: a first twin submerged arc welding ("SAW") head arranged proximal to a second twin SAW head, the first twin SAW head configured to: direct at least two first consumable wires toward a surface of the workpiece; and introduce a first current to the at least two first consumable wires for melting the at least two first consumable wires via resistive heating when they contact a molten slag pool formed on the workpiece; and the second twin SAW head configured to: direct at least two second consumable wires toward the surface of the workpiece; and introduce a second current to the at least two second consumable wires for melting the at least two second consumable wires via resistive heating when they contact the molten slag pool formed on the workpiece; wherein the first and second twin SAW heads are configured to translate together to form a cladded deposit on the workpiece.

In some aspects, the techniques described herein relate to a system, wherein the at least two first consumable wires include a first leading wire and a first trailing wire; and the first current includes a direct current.

In some aspects, the techniques described herein relate to a system, wherein the at least two second consumable wires include a second leading wire and a second trailing wire; and the second current includes an alternating current.

In some aspects, the techniques described herein relate to a system, wherein the molten slag pool includes a conductive flux.

In some aspects, the techniques described herein relate to a system, wherein the conductive flux is configured to: conduct the first current between the at least two first consumable wires and the molten slag pool to facilitate resistive heating; and conduct the second current between the at least two second consumable wires and the molten slag pool to facilitate resistive heating.

In some aspects, the techniques described herein relate to a system, wherein the cladded deposit includes NiCrMo3 with less than 5% iron content.

In some aspects, the techniques described herein relate to a system, wherein the first and second twin SAW heads are further configured to deposit cladded deposit at a rate of about 25 to 36 kg/hour.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the techniques presented herein utilize two twin submerged arc welding ("SAW") heads arranged in close proximity while in a diagonal orientation/positioning with respect to one another. Rather than using a conventional SAW flux with the twin SAW heads, during operation, an electroslag flux is disposed on a workpiece to facilitate melting the wires via contact resistance heating (e.g., without an arc) to create a cladded deposit on the workpiece.

Because each head is a twin head, the overall system deposits four consumables (e.g., wires) per pass. Moreover, the orientation/positioning is carefully selected so that a trailing twin SAW head overlaps half of the width of a leading twin SAW head. Using four consumables in these positions creates a metallurgical deposition layer with increased thickness and increased width. But, due to the partially offset positioning of the two heads, the four wires create a single cladded deposit, or bead, and, thus, the cladding is fully fused (e.g., no lack of fusion) and has proper geometry, including proper wetting angles (which define the slope of the cladding deposit where it meets the base material).

Moreover, due to the specific orientation/positioning and the electroslag-style melting of the SAW wires, the process is able to clad a base material with very low penetration of the base material and very low dilution of the cladding (e.g., the base material, comprising iron, steel, or other iron alloy, is a small component of the cladding's composition). Thus, among other advantages, the proposed concept can create a cladding of 625 alloy type (NiCrMo3) with a chemical composition that has less than 5% iron content, as is often required by the standards/markets.

By comparison, single head cladding solutions (whether single wire SAW, twin SAW, or electroslag strip cladding ("ESSC")) cannot create such a metallurgical deposition with iron content below 5% in a single pass and must use multiple layers (e.g., multiple passes) to meet this requirement. For example, SAW cladding cannot deposit enough material without creating unwanted dilution (creating cladding with iron content above 5%). Single wire SAW heads often need at least three passes depositing at least three layers of cladding deposit to create an adequate amount of cladding with less than 5% iron content. Meanwhile, twin wire SAW heads often required at least two passes depositing at least two layers of cladding deposit to create an adequate amount of cladding with less than 5% iron content. Still further, ESSC processes might get close to 5% iron content during each pass, but produce very low deposition and require extra passes/layers to create a cladding with a desired thickness.

The embodiments described herein achieve the foregoing advantages by setting the power and geometry of the twin SAW heads to minimize penetration/dilution while maximizing deposition. First, because the system includes two twin SAW heads, specific power parameters can be used to minimize penetration and maximize deposition. For example, the first/leading SAW head can receive DC− (negative) power that minimizes penetration while the second SAW head can receive AC power that maximizes deposition (and since its trailing a DC− SAW head, there will be enough penetration for cladding). By comparison, if a cladding setup only has one head, it typically requires DC+ (positive) for cladding. Second, the head setup/positioning and flux content spread heat transfer across a wider area, which also reduces penetration and dilution. For example, using a conductive flux (e.g., electroslag flux) allows the heat transfer area to expand vertically (at least as compared to SAW flux). Meanwhile, using two partially overlapped twin SAW heads allows the heat transfer area to expand laterally, across a wider bead formed by four wires from two heads.

In view of the foregoing, the proposed dual-twin SAW system enables highly-effective cladding with increased productivity, at least as compared to conventional wire or electroslag strip cladding processes. For example, the dual-twin SAW system may produce cladded deposition rates of approximately 25-36 kg/hour, more particularly approximately 28 kg/hour, while conventional processes are limited to approximately 18 kg/hour. Moreover, conventional processes may require multiple passes along an area with multiple layers of cladding to meet a desired/threshold cladding thickness and composition. Meanwhile, the dual-twin SAW system can meet desired/threshold cladding thickness and composition with a single pass that deposits a single layer of the cladded deposit.

Figure 1:
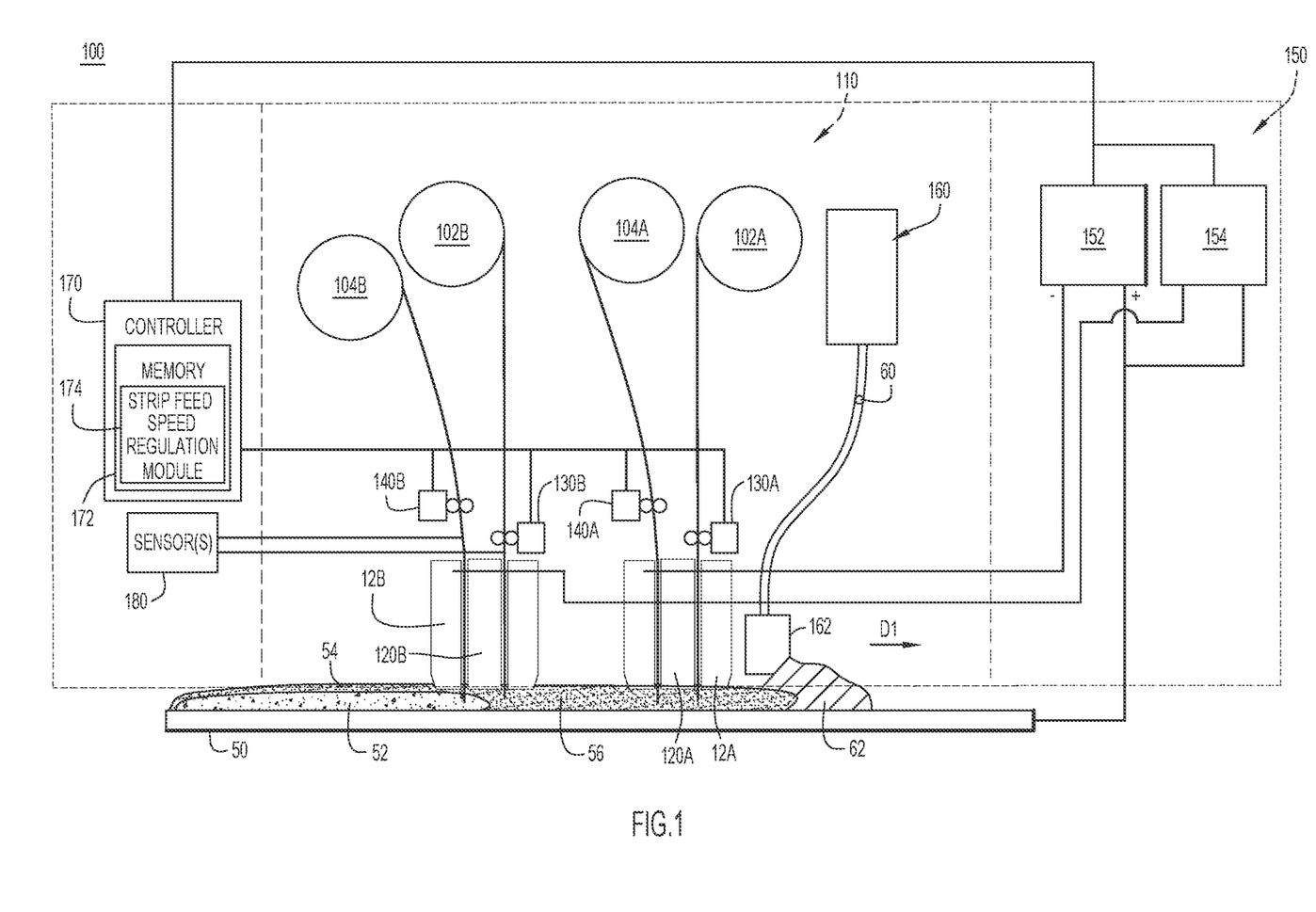
FIG. 1 is a schematic diagram of a cladding environment with a dual-twin SAW cladding system according to an exemplary embodiment.

Now referring to FIG. 1 for a description a cladding environment 100 having a dual-twin SAW cladding system 110, according to an embodiment. In environment 100, various components of cladding system 110 are illustrated performing cladding operations on a workpiece 50. The dual-twin SAW system 110 includes a first/leading twin SAW head 12A and a second/trailing twin SAW head 12B. Generally, the system 110 is configured to guide or feed a first leading wire 102A and a first trailing wire 104A of cladding material through the first twin SAW head 12A while also guiding a second leading wire 102B and a second trailing wire 104B of cladding material through the second twin SAW head 12B.

As is illustrated, the first and second twin SAW heads 12A and 12B guide the leading and trailing wires 102A, 102B, 104A, 104B towards the workpiece 50. More specifically, in the depicted embodiment, the system 110 includes wire feeders 130A, 140A, 130B, 140B, that are configured to feed the wires 102A, 104A, 102B, 104B to contact jaws 120A, 120B of each twin SAW head 12A, 12B. For example, wire feeder 130A is configured to feed the first leading wire 102A to contact jaw 120A of the first twin SAW head 12A, and wire feeder 140A is configured to feed the first trailing wire 104A to the contact jaw 120A of the first twin SAW head 12A. Meanwhile, wire feeder 130B is configured to feed the second leading wire 102B to contact jaw 120B of the second twin SAW head 12B, and wire feeder 140B is configured to feed the second trailing wire 104B to the contact jaw 120B of the second twin SAW head 12B. The contact jaws 120A, 120B then guide the wires 102A, 104A, 102B, and 104B towards the workpiece 50.

However, to be clear, FIG. 1 is merely a schematic diagram and is not intended to be limiting in any manner. In fact, in some implementations, the system 110 may include more than two twin SAW heads. Additionally or alternatively, in some implementations, the system 110 may guide or feed more than four wires to the workpiece 50. Still further, in some implementations, each head 12A and 12B may include a plurality of contact jaws 120A, 120B.

Moreover, in the depicted embodiment, the leading wires 102A, 102B and the trailing wires 104A, 104B are each provided as spools or coils of cladding material (i.e., spools of metal wires). However, in other embodiments, the wires 102A, 102B, 104A, 104B can be fed from any desirable reservoir.

Still referring to FIG. 1, the twin SAW heads 12A and 12B are disposed in close proximity to one another and arranged to translate together in the cladding direction D1, insofar as "cladding direction" is the direction in which a clad is intended to run (i.e., the cladding direction is the direction of movement of a twin SAW heads 12A and 12B). Consequently, the first twin SAW head 12A may be referred to as the leading twin SAW head 12A and the second twin SAW head 12B may be referred to as the trailing twin SAW head 12B. However, in other embodiments, three or more twin SAW heads can be arranged in various settings or formations. For example, referring to FIG. 2, the leading twin SAW head 12A is arranged such that the wires 102A and 104A extend perpendicularly to the workpiece 50. Meanwhile, the trailing twin SAW head 12B is arranged such that the wires 102B and 104B are angled towards the cladding direction D1 and oblique to the workpiece 50 at an angle cp. In the embodiment depicted in FIG. 2, the angle $\varphi$ is between approximately 10 to 20 degrees from vertical. In some instances, the angle $\varphi$ of wires 102B and 104B is 15 degrees from the vertical (e.g., 15 degrees pushing). The arrangement of the twin SAW heads 12A, 12B, and wires 102A, 102B, 104A, and 104B is discussed in greater detail below with reference to FIG. 3A.

Referring back to FIG. 1, the system 110 also includes a flux hopper 160 that is a repository for conductive flux 60 and is configured to selectively deliver the conductive flux 60 to a flux drop 162 disposed adjacent to the leading twin SAW head 12A. Fluxes are generally granular fusible minerals typically containing oxides of manganese, silicon, titanium, aluminum, calcium, zirconium, magnesium, niobium, and other compounds such as calcium fluoride. The role of the conductive flux 60 is described in further detail below, but, generally, the conductive flux 60 helps melt the wires 102A, 102B, 104A, and 104B through resistive heating to produce a cladded deposit 52 with a specific chemical composition and specific mechanical properties under a layer of hardened slag 57. That is, the conductive flux 60 is specially formulated to be compatible with wires 102A, 102B, 104A, and 104B of cladding material so that the combination of flux 60 and the wires 102A, 102B, 104A, and 104B produces desired mechanical properties. In some implementations, the conductive flux 60 may be a very high basic agglomerated flux for electroslag cladding. The flux has low viscosity and is suitable for cladding with Ni-base and fully-austenitic alloys.

In the depicted embodiment, the conductive flux 60 is delivered (i.e., by a nozzle of the flux drop 162) to a leading edge of the leading twin SAW head 12A to produce a protective layer 62 over a molten slag pool 56, as is described in further detail below. Additionally or alternatively, conductive flux 60 may be delivered to the trailing edge of the leading twin SAW head 12A to provide a layer of flux over any molten slag 56 included above the metal cladded deposit 52 (i.e., the system 110 may include a second or repositioned hopper 160 and drop 162). Alternatively, in some implementations, the hopper 160 and drop 162 may be omitted, and the conductive flux 60 may be otherwise applied to the workpiece 50 (e.g., by hand).

In the depicted embodiment, the cladding system 110 also comprises a power source 150, a controller 170, and one or more sensors 180. These components are each shown in dashed boxes connected to the dashed box of system 110 because these components may be included in system 110 (i.e., included during manufacturing of system 110), connected thereto (e.g., retrofitted to the system 110 and/or connected via a wired or wireless connection) or, in some cases, omitted. For example, the operations of controller 170 may be executed by components included in the power source 150 (e.g., the controller 170 may be a user interface and may regulate feed speed of wires 102A, 102B, 104A and 104B). Each of these components is addressed in turn below.

First, the power source 150 may be included in or connected to the system 110 and may include any number or type of power sources, such as a welding converter, a welding transformer, a rectifier, a thyristor controlled rectifier or an inverter. As an example, power source 150 may include a direct current (DC) power source 152 and an alternating current (AC) power source 154 that are each connected to the system 110. Regardless of how the power source 150 is provided, the power source 150 provides current to the contact jaws 120A, 120B that flows into the wires 102A, 102B, 104A and 104B fed therethrough. The current is transferred to the entire surface area of the wires 102A, 102B, 104A and 104B in contact with the contact jaw 120 and the current is applied individually to each wire 102A, 102B, 104A and 104B passing through twin SAW heads 12A and 12B.

In some implementations, the DC power source 152 may supply approximately 570 Amperes of negative DC current at approximately 32 Volts to the first twin SAW head 12A. Meanwhile, the AC power source 154 may supply approximately 520 Amperes of AC current at approximately 33 Volts to the second twin SAW head 12B. In some implementations, the DC power source 152 may supply power at any other parameters, such as between approximately 400 Amps and approximately 1000 Amps of negative DC current. Likewise, the AC power source 154 may supply power at any other parameters, such as between approximately 400 Amps and approximately 1000 Amps of AC current.

However, since each head 12A and 12B is electrically coupled a single source (e.g., twin head 12A is electrically coupled to DC power source 152 and twin head 12B is electrically coupled to AC power source 154), wire 102A receives the same magnitude of current as wire 104A, and wire 102B receives the same magnitude of current as wire 104B. That is, wires 102A and 104A may receive approximately equal amounts of negative DC current (DC−) individually (dependent on localized resistance levels in the molten slag). Meanwhile, wires 102B and 104B may receive approximately equal amounts of AC current individually (dependent on localized resistance levels in the molten slag). The current from each wire 102A, 104A, 102B, 104B passes into the layer of electrically conductive slag 54. As described in further detail below in connection with FIG. 2, the resistance of the slag 54 generates heat as the slag 54 receives current to effectuate the cladding process (e.g., the temperature of the slag adjacent the wires providing current may raised to approximately 2,300° C. by resistive or joule heating).

Second, the controller 170 is connected to the system 110 and configured to control the leading feeders 130A, 130B and the trailing feeders 140A, 140B. More specifically, the controller 170 includes a memory 172 with a wire feed speed regulation module 174 and the wire feed speed regulation module 174 is configured to control the wire feeders 130A, 130B, 140A, 140B. In some embodiments, the controller 170 is local to the system 110; however, in other embodiments, the controller 170 may be remote from the system 110 and may be connected thereto via a network connection (e.g., a network connection formed by a communication interface included in the controller 170).

In some implementations, the first set of feeders 130A and 140A may each feed a NiCrMo-3 wire having a diameter of 2 or 4 mm at a wire feed speed of approximately 320 cm/min. That is, two wires may be fed from the first set of feeders 130A and 140A to the leading twin head 12A, each at a speed of approximately 320 cm/min. Meanwhile, the second set of feeders 130B and 140B may each feed a NiCrMo-3 wire having a diameter of 2 or 4 mm at a wire feed speed of approximately 280 cm/min. That is, two wires may be fed from the second set of feeders 130B and 140B to the trailing twin head 12B, each at a speed of approximately 280 cm/min. However, these speeds and wire sizes are merely examples and the techniques presented herein may also utilize other parameters, such as wire feed speeds between approximately 200 cm/min and approximately 400 cm/min. Moreover, the feed speed of wires fed through one head need not be identical and/or the one or more wires fed through the trailing twin head 12B need not be less than the feed speed of one or more wires leading twin head 12A. That is, in different embodiments, any combination of feed speeds may be used.

Third, the system 110 may include or be coupled to one or more sensors 180. The sensor(s) are configured to measure the feed speed of the leading wires 102A, 102B and/or the feed speed of trailing wires 104A, 104B. The sensor(s) 180 may measure the feed speed by measuring the speed with which a wire passes through the contact jaws 120A, 120B, the speed with which a spool of the wire unwinds (e.g., a pulse sensor may count rotations of a wire coil), or any other parameter that is indicative of speed, such as motor parameters (e.g., motor parameters of motors in feeders 130A, 130B, 140A, and 140B), welding current, etc. Sensor(s) 180 may also measure or monitor any welding parameters, which are described in further detail below, including voltage, current, and other electrical parameters. For example, sensor(s) 180 may include one or more shunts in the power source 150 to measure electrical parameters. The sensor(s) 180 may send any data to the controller 170 so that the controller 170 can determine a feed speed of one or more wires and/or any welding parameters. Information measured or collected by sensor(s) 180 is advantageously sent to the controller 170 as soon as it is measured/collected, to prevent unnecessary delays in feed speed regulation/adjustment.

Figure 2:
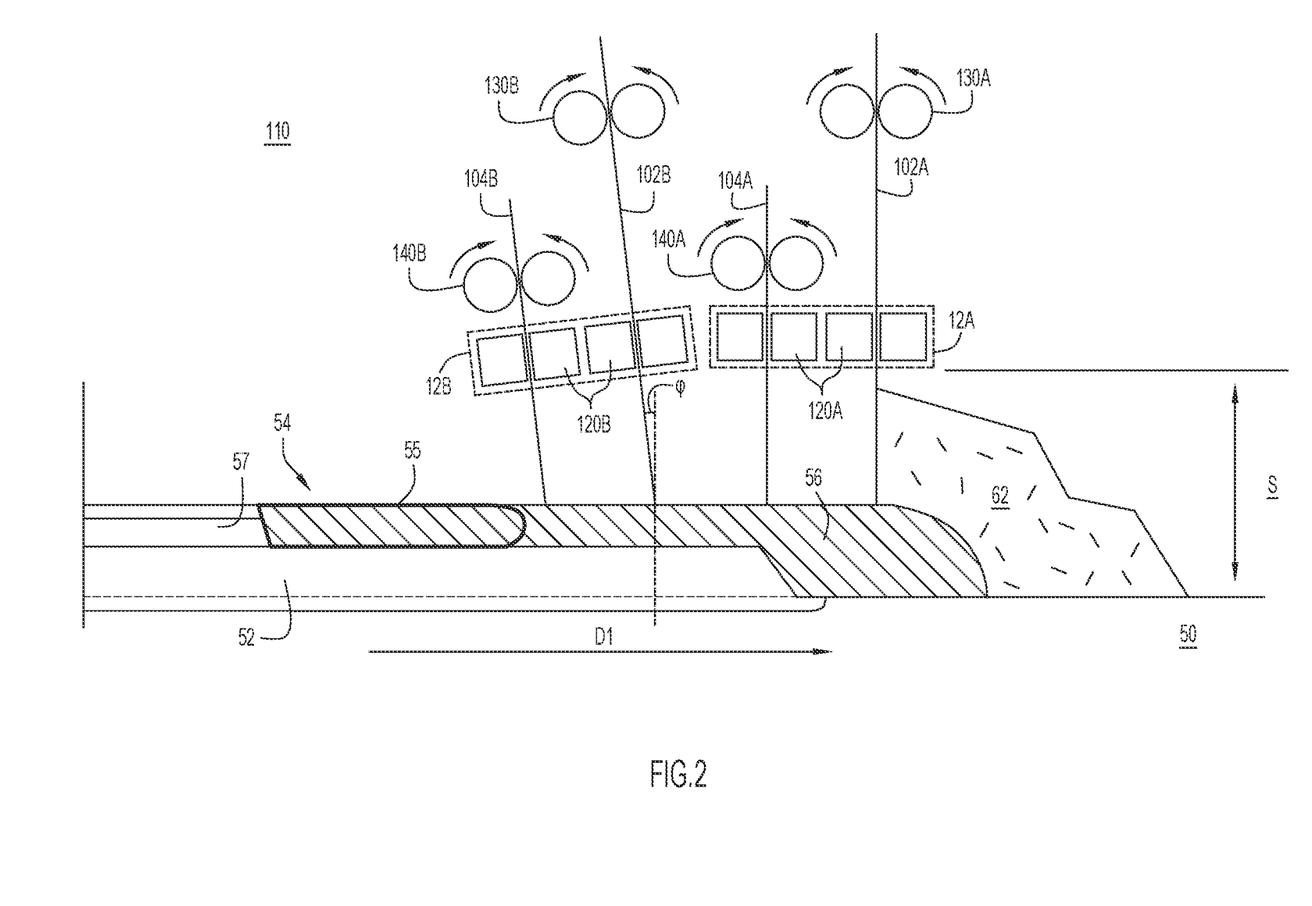
FIG. 2 is a schematic diagram of the dual-twin SAW system of FIG. 1 during operation.

Now referring to FIG. 2, but with continued reference to FIG. 1, the system 110 is generally configured to clad a workpiece 50 with the wires 102A, 104A, 102B, and 104B in accordance with electroslag cladding ("ESC") principles, but using twin SAW heads 12A and 12B. That is, the physical principles that control the ESC processes effectuated by system 110 to clad with wires are substantially the same as the physical principles used for ESC methods that typically weld or clad with strip consumables. However, the specific arrangement of the twin SAW heads presented herein is able to leverage ESC principles to quickly and efficiently clad the workpiece 50 with low penetration of the base material of the workpiece 50 and low dilution of the cladding (e.g., the base material is a small component of the cladding's composition). Moreover, DC current is delivered to wires 102A and 104A, and AC current is delivered to wires 102B and 104B to further control the deposition rate, penetration, and dilution of the cladding to create a cladded surface with a desired cladding composition.

By way of example, initially, the flux drop 162 releases conductive flux 60 and a molten slag pool 56 is formed from at least the first wire 102A, the workpiece 50, and pulverized conductive flux 60. Once the slag pool 56 is large enough for ESC operations (e.g., once the "stick out" of the wire from the slag pool, which is illustrated as "S" in FIG. 2, is sufficient to extinguish an electrical arc used to initially create a molten slag pool), the system 110 can begin cladding operations. That is, once the slag pool is large enough, the system 110 can move, or translate, in the cladding direction D1 and/or the workpiece 50 can be moved in direction opposite to D1 to initiate ESC operations.

For example, the twin heads 12A and 12B and/or the workpiece 50 may be translated such that the relative speed between the twin heads 12A and 12B and the workpiece 50 is between approximately 45 cm/min and approximately 55 cm/min, such as at approximately 50 cm/min. In some implementations the stick out distance S of wires 102A and 104A is approximately 20 mm to approximately 30 mm, such as approximately 25 mm. Meanwhile, the stick out distance S of wires 102B and 104B is approximately 25 mm to 35 mm, such as approximately 30 mm. However, again, these dimensions are merely examples and various embodiments may create and/or utilize different dimensions, within and/or across heads of the system presented herein.

However, this start-up process is described only by way of background and it is to be understood that the techniques presented herein are intended for use during a welding or cladding phase, which may be a phase during which a cladding action is carried out. That is, the cladding phase may be the phase between a start-up phase (e.g., creation of the molten slag pool and stabilization of cladding parameters) and a stop phase (e.g., termination of the cladding process).

During cladding operations, current is introduced to the first wire 102A and the second wire 104A at contact jaw 120A. The first pair of wires 102A and 104A are then brought into contact with the slag layer 54 and the current flows through the first pair of wires 102A and 104A and into the layer of electrically conductive slag 54. More specifically, a DC current flows through the first pair of wires 102A and 104A into a molten portion (e.g., molten slag pool 56) of the slag layer 54. In some implementations, the DC current is a negative current.

Meanwhile, current is introduced to the second pair of wires 102B and 104B at contact jaw 120B. The second pair of wires 102B and 104B are then brought into contact with the slag layer 54 and the current flows through the second pair of wires 102B and 104B and into the molten slag pool 56. More specifically, a AC current flows through the second pair of wires 102B and 104B into the molten slag pool 56 before it hardens (as indicated at slag transition portion 55) into the cladded deposit 52.

The resistance of the molten slag pool 56 to the current flowing from the first and second pairs of wires 102A, 102B, 104A, 104B generates heat that maintains the cladding process (e.g., the slag pool temperature remains at approximately 2,300° C., at least adjacent the wires 102A, 102B, 104A, 104B). Consequently, as the cladding operations proceed in the welding direction D1, the first pair of wires 102A and 104A, the second pair of wires 102B and 104B, and a portion of the workpiece 50 are melted by the molten slag pool 56 to form a molten metal that eventually hardens onto the workpiece 50 as a cladded deposit 52.

The flux 60 also melts, at least in part, as the wires 102A, 102B, 104A, and 104B and the portion of the workpiece 50 are melted, creating the protective layer of slag 54 over the cladded deposit 52. That is, molten slag 56 extends over a molten cladded deposit, so that the molten slag 56 includes a portion above the cladded deposit 52 and a molten slag pool at the leading edge of the cladded deposit 52. Eventually, the molten slag layer 56 above the cladded deposit 52 solidifies, as is shown at 57. Consequently, the resultant cladded deposit 52 may be formed from a combination of the material of the first pair of wires 102A and 104A, the material of the second pair of wires 102B and 104B, the flux 60, and the workpiece 50. Throughout this process, a layer 62 of pulverized flux 60 protects the leading edge of the molten slag pool 56. The hardened slag 57 may be removed when cooled to reveal the cladded deposit 52.

Figure 3A:
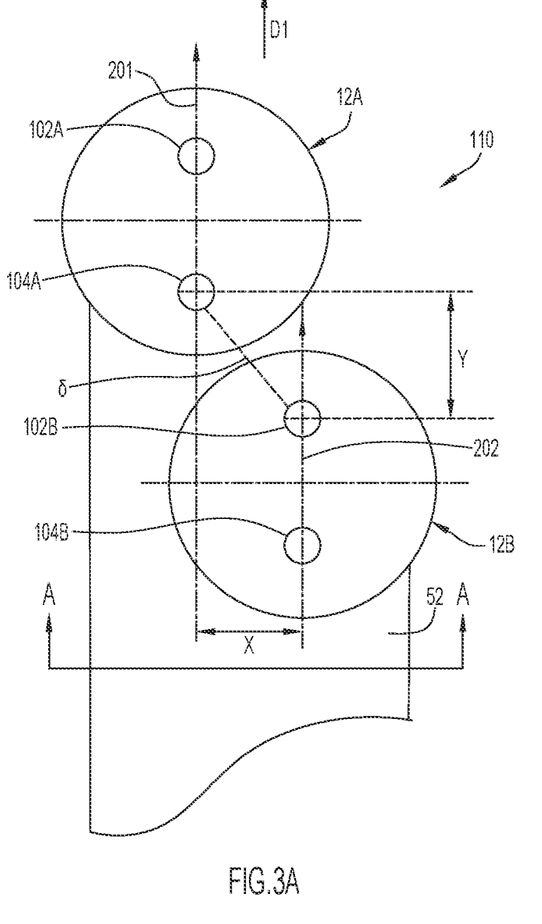
FIG. 3A is a schematic diagram depicting spacing between SAW heads of the dual-twin SAW cladding system of FIG. 1.

Now referring to FIG. 3A, a schematic top view of the twin SAW heads 12A and 12B of the cladding system 110 during a cladding operation is illustrated. The conductive flux 60, 62, the slag pool 56, and the hardened slag 57 are omitted for clarity. As depicted in FIG. 3A, the first and second twin SAW heads 12A and 12B are arranged in close proximity to one another to generate a cladded deposit 52 having a desired composition along a cladding direction D1. Specifically, the second or trailing twin SAW head 12B is transversely offset by offset X (e.g., perpendicularly to the cladding direction D1) and longitudinally offset by offset Y (e.g., in a direction parallel to the cladding direction D1) from the first twin SAW head 12A. As an example, in some implementations, the traverse offset X may be between approximately 8 mm and approximately 12 mm, such as approximately 10 mm. Further, the longitudinal offset Y may be between approximately 0.5 mm and approximately 3.5 mm, such as approximately 2 mm.

As shown in FIG. 3A, the first or leading twin SAW head 12A guides the first leading wire 102A and the first trailing wire 104A in parallel towards the workpiece 50. The twin SAW head 12A aligns first leading wire 102A and the first trailing wire 104A such that they contact the molten slag pool along a first cladding line 201 parallel to the cladding direction D1. That is, the first trailing wire 104A is longitudinally offset from the first leading wire 102A along the first cladding line 201. Meanwhile, the second or trailing twin SAW head 12B guides the second leading wire 102B and second trailing wire 104B in parallel towards the workpiece 50. That is, the second leading wire 102B and the second trailing wire 104B are aligned along a second cladding line 202. Consequently, the second trailing wire 104B is longitudinally offset from the second leading wire 102B along the second cladding line 202.

A separation distance δ between the first trailing wire 104A of the first head 12A and the second leading wire 102B of the second head 12B is minimized to generate a cladded deposit 52 having a desired composition. For example, the distance δ may be less than 15 mm. In some implementations, the distance δ may be about 11 mm. In the embodiment depicted in FIG. 3A, the transverse offset X is set such that the cladding line 202 of the second twin SAW head 12B is aligned with an outer edge of a cladding or molten slag pool generated by the first twin SAW head 12A. That is, the second leading and second trailing wires 102B and 104B are aligned along an outer edge of the cladding or molten slag pool generated by the first twin SAW head 12A to generate a final cladded deposit 52 having a desired width W1, thickness T, and composition (see FIG. 3B). In some implementations, the thickness T may be between approximately 6 mm and 10 mm, such as approximately 8 mm.

Figure 3B:
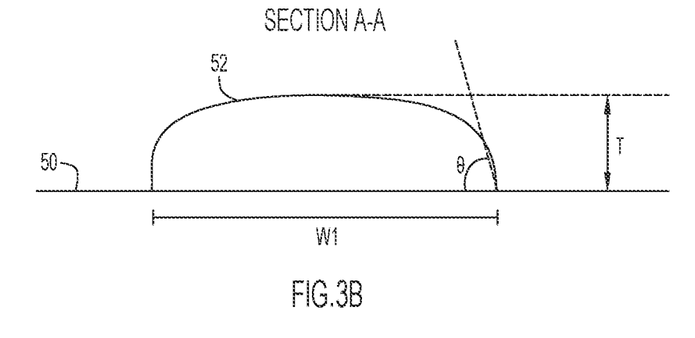
FIG. 3B is a cross-sectional view of a cladded deposit from the dual-twin SAW cladding system of FIG. 1.

The arrangement of the twin SAW heads 12A and 12B (in conjunction with the conductive flux 60) allows for an increased amount of cladded deposit 52 with an increased thickness and favorable wetting angles (e.g., less than 90°), as compared to conventional SAW cladding (e.g., arc-based processes), while also meeting a desired chemical composition. Referring to FIG. 3B, a cross-sectional view of the cladded deposit 52 generated by the dual-twin SAW system 110 taken along line A-A of FIG. 3A is shown. As noted above, the hardened slag layer 57 is omitted for clarity. As depicted, the cladded deposit 52 has a thickness T measured from the outer surface of the workpiece 50, a width W1, and wetting angle θ. The thickness T of the cladded deposit 52 meets or exceeds a desired cladding thickness for the workpiece 50. For example, the thickness T may be approximately 8 mm. Consequently, the dual-twin SAW system 110 can apply a cladded deposit 52 meeting a desired cladding thickness with a desired chemical composition (e.g., NiCroMo3 with iron content below 5% at about 8 mm thick) onto the workpiece 50 with a single pass.

Moreover, the cladded deposit 52 may be widened by passing the dual-twin SAW system 110 over a portion the cladded deposit 52, while maintaining the desired thickness T. For example, the first twin SAW head 12A may be arranged such that the first cladding line 201 is inwardly offset (e.g., overlapping) from and parallel to an outer edge of the cladded deposit 52 by approximately 6 to 8 mm (e.g., from the edge of the cladded deposit towards the center of the cladded deposit 52). Then, the second cladding line 202 from the second twin SAW head 12B may be aligned along the outer edge of the cladded deposit 52. Accordingly, the width of the cladded deposit 52 may be widened with additional passes until an entirety or at least a desired portion of the workpiece 50 is cladded with cladded deposit 52.

Figure 4A:
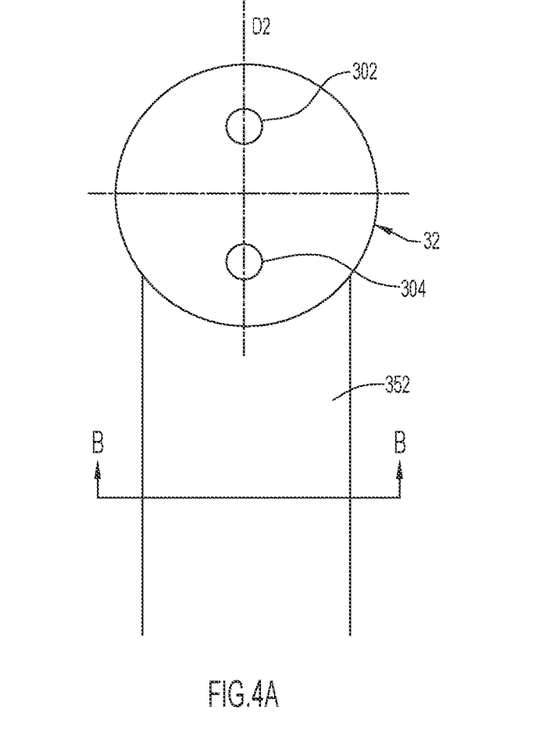
FIG. 4A is a schematic diagram of a single twin SAW cladding system.
Figure 4B:
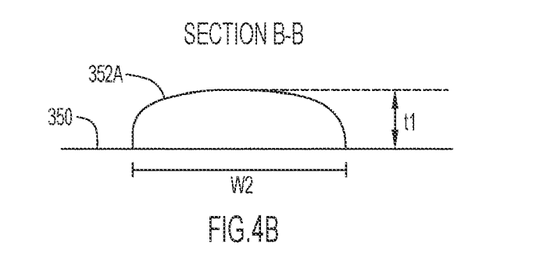
FIG. 4B, is a cross-sectional view of a cladded deposit from a single pass of the single twin cladding system of FIG. 4A.

For comparison, FIG. 4A depicts a schematic of a top view of a single conventional twin SAW head 32 during a SAW cladding operation (e.g., using an arc and SAW flux to deposit cladding). FIG. 4B is a cross-sectional view of a cladded deposit 352A generated by the twin SAW head 32 taken along line B-B of FIG. 4A. A slag pool, SAW flux, and hardened slag are omitted for clarity. During operation, the twin SAW head 32 guides a leading wire 302 and a trailing wire 304 in parallel towards a workpiece 350. The trailing wire 304 is offset from the leading wire 302 in a cladding direction D2. The twin SAW head 32 conducts current to the wires 302, 304. With the help of the SAW flux (not shown), the current arcs from distal tips of the wires 302, 304 to the workpiece 350. The arc melts the wires 302, 304, at least a portion of the SAW flux, and at least a portion of the workpiece 350 to create and maintain a cladding pool. As the twin SAW head 32 moves along the cladding direction D2, the arc (facilitated by the SAW flux) continuously melts the wires 302, 304 and portion of the workpiece 350, to apply a cladded deposit 352 onto the workpiece 350.

Figure 4C:
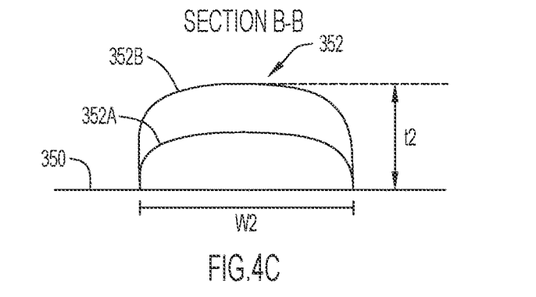
FIG. 4C is a cross-sectional view of a cladded deposit from two passes of the single twin cladding system of FIG. 4A.

Referring to FIG. 4B, a first layer 352A of cladded deposit 352 has a thickness t1 and a width W2. Due at least in part to the arcing between wires 302, 304 and the workpiece 350, the thickness t1 and width W2 must be limited to ensure that the chemical composition of the first layer 352A has less than 5% iron content. That is, the thickness t1 and width W2 have a maximum value that may be applied using the conventional twin SAW head 32 to meet a desired chemical composition of the cladding 352. However, this limited thickness t1 typically does not meet the cladding thickness requirements. Therefore, the conventional twin SAW head 32 must apply a second layer 352B of cladded deposit, as shown in FIG. 4C. That is, the conventional twin SAW head 32 must make two passes over a portion of the workpiece 350 to provide a cladded deposit 352 that meets the cladding chemical composition and thickness requirements.

FIG. 4C depicts a cladded deposit 352 with the second layer 352B deposited the first layer 352A. The combined thickness of the first and second layers 352A and 352B of cladded deposit 352 and has a thickness t2 that is greater than T and t1. That is, in at least the depicted embodiment t2≥T>t1. However, in other embodiments, t2 may be equal to or slightly less than T, provided that T still satisfies minimum thickness requirements.

Moreover, a second width W2 of the cladded deposit 352 is less than W1, and the twin saw head 32 must be aligned with an outer edge of the cladded deposit 352. Therefore, the conventional twin SAW head 32 covers less surface area of the workpiece 350 per pass than the dual-twin SAW system 110. Consequently, the number of passes to clad an entirety of workpiece 350 are compounded by applying two layers 352A, 352B of cladding material with a smaller area per pass. Conversely, the dual-twin SAW system 110 can apply cladding over the same area with a desired thickness with a single layer and fewer passes as compared to the conventional twin SAW head 32. That is, the dual-twin SAW system 110 clads a larger surface area of the workpiece 50 as it translates across the workpiece 50, as compared to conventional systems, while also meeting a required cladding thickness with a single layer (and achieving a desired chemical composition). Consequently, the dual-twin SAW system 110 can clad an entirety of a workpiece 50 in less time than a conventional cladding systems.

Accordingly, the arrangement of the twin SAW heads 12A and 12B in conjunction with the conductive flux generates a single-layer cladded deposit 52 having a desired cladding thickness while a reducing dilution and minimizing the transfer of iron from the workpiece 50 to the cladding.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "left," "right," "front," "rear," "side," "height," "length," "width," "interior," "exterior," "inner," "outer" or other similar terms merely describe points of reference and do not limit the present invention to any particular orientation or configuration. When used to describe a range of dimensions and/or other characteristics (e.g., time, pressure, temperature, distance, etc.) of an element, operations, conditions, etc. the phrase "between X and Y" represents a range that includes X and Y.

Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity, and does not in itself dictate a relationship between the various embodiments and/or configurations discussed.

When used herein, the term "comprises" and its derivations (such as "comprising", "including," "containing," etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the similar terms, such as, but not limited to, "about," "around," and "substantially."

As used herein, unless expressly stated to the contrary, use of the phrase "at least one of", "one or more of", "and/or", and variations thereof are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Further as referred to herein, "at least one of" and "one or more of" can be represented using the "(s)" nomenclature (e.g., one or more element(s)).

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements.

The invention claimed is:

1. A system for cladding a workpiece, the system comprising:
   a first twin submerged arc welding ("SAW") head configured to receive a first leading wire and a first trailing wire along a first cladding line;
   a second twin SAW head configured to receive a second leading wire and a second trailing wire along a second cladding line, the second twin SAW head arranged behind the first twin SAW head along a welding direction; and
   a flux hopper configured to apply a conductive electroslag flux to the workpiece, wherein the conductive electroslag flux facilitates resistive heating of the first leading wire, the first trailing wire, the second leading wire, and the second trailing wire to melt the conductive electroslag flux without generating an arc and form a molten slag pool, and the conductive electroslag flux electrically couples at least the first leading wire and the first trailing wire to one another to facilitate heat transfer to encourage formation of a thick cladded deposit on the workpiece via the molten slag pool;
   wherein the second cladding line is offset from the first cladding line in a direction perpendicular to the first cladding line.

2. The system of claim 1, wherein a separation distance between the first trailing wire and the second leading wire is set to deposit a single layer of NiCrMo3 with less than 5% iron content, wherein a thickness of the single layer meets a desired cladding thickness.

3. The system of claim 2, wherein the separation distance is less than 10 mm.

4. The system of claim 1, wherein the flux hopper is configured to apply the conductive electroslag flux to the workpiece adjacent to the first twin SAW head.

5. The system of claim 1, comprising a power source configured to direct one or more currents to the first leading wire, the first trailing wire, the second leading wire, the second trailing wire, or any combination thereof, wherein the molten slag pool formed by melting the conductive electroslag flux receives the one or more currents and generates heat via resistive heating.

6. A system for cladding a workpiece, the system comprising:
   a first twin submerged arc welding ("SAW") head arranged proximal to a second twin SAW head, the first twin SAW head configured to:
      direct at least two first consumable wires toward a surface of the workpiece; and
      introduce a first current to the at least two first consumable wires for melting the at least two first consumable wires via resistive heating when they contact a molten slag pool formed on the workpiece; and
   the second twin SAW head configured to:
      direct at least two second consumable wires toward the surface of the workpiece; and
      introduce a second current to the at least two second consumable wires for melting the at least two second consumable wires via resistive heating when they contact the molten slag pool formed on the workpiece; and
   a flux hopper configured to apply a conductive electroslag flux to the surface of the workpiece, wherein the conductive electroslag flux facilitates resistive heating of the at least two first consumable wires and the at least two second consumable wires to melt the conductive electroslag flux without generating an arc and form the molten slag pool, and the conductive electroslag flux electrically couples the at least two first consumable wires to one another to facilitate heat transfer to encourage formation of a thick cladded deposit on the workpiece via the molten slag pool;
   wherein the first and second twin SAW heads are configured to translate together to form the thick cladded deposit across the surface of the workpiece.

7. The system of claim 6, wherein the at least two first consumable wires comprise a first leading wire and a first trailing wire and the first current comprises a direct current.

8. The system of claim 7, wherein the at least two second consumable wires comprise a second leading wire and a second trailing wire and the second current comprises an alternating current.

9. The system of claim 6, wherein the molten slag pool comprises the conductive electroslag flux and is configured to receive the first current and/or the second current to generate heat via resistive heating.

10. The system of claim 6, wherein the conductive electroslag flux is configured to:
    conduct the first current between the at least two first consumable wires and the molten slag pool to facilitate resistive heating; and
    conduct the second current between the at least two second consumable wires and the molten slag pool to facilitate resistive heating.

11. The system of claim 6, wherein the thick cladded deposit comprises NiCrMo3 with less than 5% iron content.

12. The system of claim 11, wherein the first and second twin SAW heads are further configured to deposit the thick cladded deposit at a rate of about 25 to 36 kg/hour.

* * * * *

UNITED STATES PATENT AND TRADEMARK OFFICE
CERTIFICATE OF CORRECTION

PATENT NO. : 12,358,066 B2
APPLICATION NO. : 17/549149
DATED : July 15, 2025
INVENTOR(S) : Rastislav Kubicek et al.

Page 1 of 1

It is certified that error appears in the above-identified patent and that said Letters Patent is hereby corrected as shown below:

In the Specification

Column 12, Line 13, please replace "110 dads" with --110 clads--

Signed and Sealed this
Second Day of September, 2025

Coke Morgan Stewart
*Acting Director of the United States Patent and Trademark Office*